June 27, 1972   F. HOCK   3,672,779
DEVICE FOR INDICATING THE POSITION OF TWO MECHANICAL
ELEMENTS RELATIVE TO ONE ANOTHER
Filed May 17, 1971
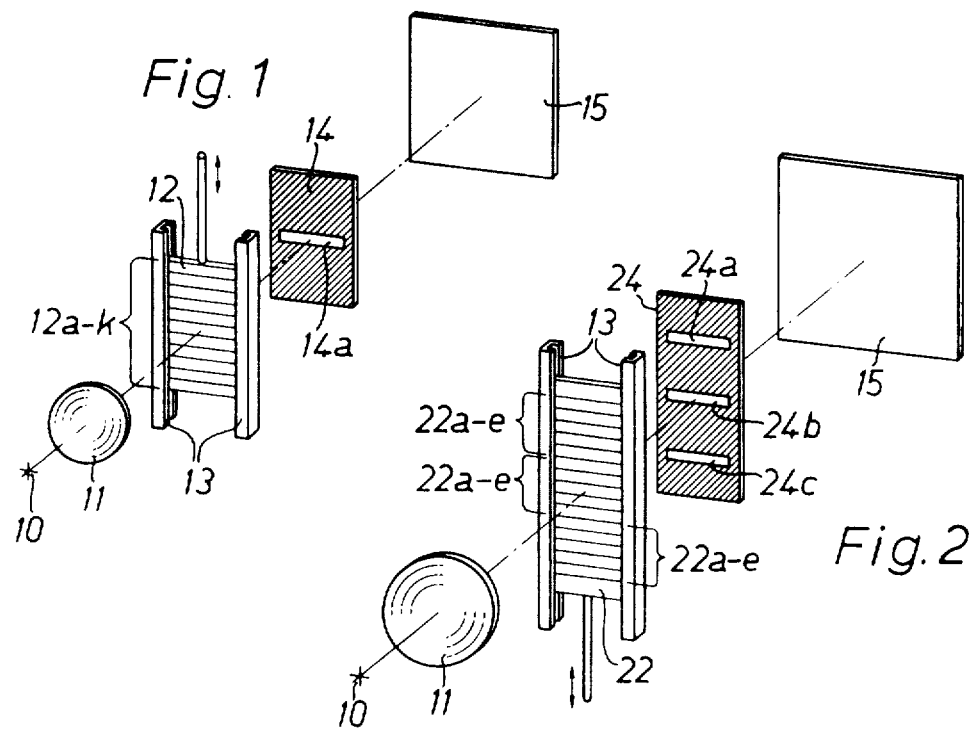
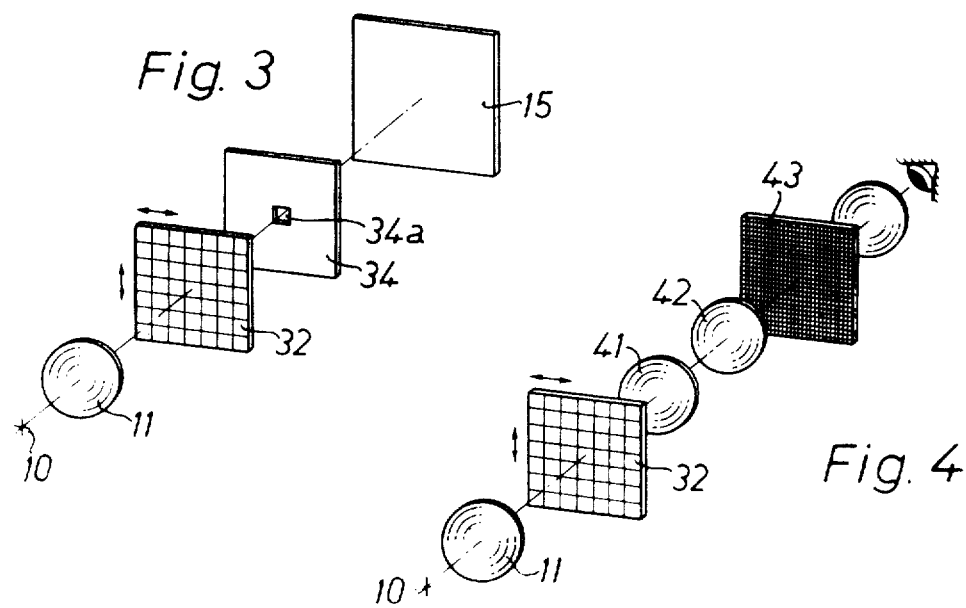
INVENTOR
FROMUND HOCK
BY
Krafft + Wells United States Patent Office 3,672,779
Patented June 27, 1972

3,672,779
DEVICE FOR INDICATING THE POSITION OF TWO MECHANICAL ELEMENTS RELATIVE TO ONE ANOTHER
Fromund Hock, Wetzlar, Germany, assignor to Firma E. Leitz GmbH, Wetzlar, Germany
Filed May 17, 1971, Ser. No. 144,079
Claims priority, application Germany, May 22, 1970, P 20 24 919.8
Int. Cl. G01b *11/26*
U.S. Cl. 356—138
9 Claims

ABSTRACT OF THE DISCLOSURE

An indicating device comprises a record carrier plate consisting of information containing elements, such as sections of holograms, and of a diaphragm having at least one aperture corresponding in shape to the shape of one of the elements. The record carrier plate and the diaphragm are displaceable relative to one another, thereby revealing one or more elements by the diaphragm apertures. The revealed elements provide an information on the position of the record carrier plate relative to the diaphragm. In a first embodiment the elements are transparent and the record carrier plate is illuminated by transmitted light so that an image caused by the information containing element is projected through the aperture onto a screen or may be observed as a virtual image behind the record carrier plate. In a second embodiment the record carrier plate is illuminated by incident light which is reflected from the revealed element also to be projected onto a screen or viewed as a virtual image. The record carrier plate may be displaceable in one or in two directions of a rectangular system of coordinates. In the first case the elements are strips extending perpendicularly to the direction of movement and in the second embodiment the elements are of square shape.

BACKGROUND OF THE INVENTION

The invention pertains to measuring devices, more particularly to devices for establishing the position of a mechanical element relative to another element, such as the position of an object to be measured relative to a measuring scale.

There are already methods and devices known by means of which so-called convertible images may be produced. Such methods and devices are insofar faintly related to the present invention as such images are produced by subdividing the image on an image carrier into strips by a raster and by projecting the strips on a screen. Further images which, for example, depict subsequent phases of a movement of a person are also present on the image carrier in subdivided form and intermittently arranged with the strips of the first image. By moving the raster over the image carrier the images are revealed one after the other, so that an observer will have the impression of a person moving on the screen.

Further, for indicating numerals, letters or symbols it is already known from a publication in the German technical periodical "Maschinenmarkt" published at Würzburg, Germany, June 7, 1963, to use two indicating plates which are movable relative and parallel to one another along a rectilinear path. One plate is provided with a raster of transparent lines which extend perpendicularly to the direction of movement and which reveal a corresponding number of strips on the second indicating plate. The latter is provided with strip-shaped marks on its surface in the manner of a code disc; the marks extend normal to the direction of displacement and correspond in width to the width of the raster lines of the first plate. The marks uncovered by the raster lines appear to the eye of an observer as plane, interconnected symbols.

The idea underlying the present invention is to use a device of approximately the above described kind for determining the position of two elements with regard to one another, even though the two elements may move relative to one another or relative to the observer. However, it being an object of the invention to provide such a device which does not entail the difficulties to which the prior art devices are subject when the elements are displaced extremely far out of their normal or rest position. In more detail, it is the object of the invention to provide a device for indicating the position of two elements by making visible position-related numerals, letters or symbols in dependence on the relative position of a record carrier plate and a diaphragm plate which are both displaceable with regard to one another. One diaphragm plate comprises a slit-shaped aperture extending in the direction of displacement; the record carrier plate is provided with transparent strip-shaped markings arranged adjacent to one another with their long sides in parallel to the slit-shaped aperture. One marking being visible through the aperture so that the position of the elements relative to one another may be determined therefrom.

SUMMARY OF THE INVENTION

Having in mind the above outlined features of such a device, the invented improvement comprises holograms or sections of holograms which are used as the strip-shaped markings. Since all sections of one particular hologram contain the same image information several strips may be mounted intermittently for one marking on the record carrier provided that the diaphragm plate has a corresponding number of apertures which must be arranged at the same distance from one another as are the different strips on the record carrier plate. In such an embodiment there are always several markings revealed by the apertures at the same time which markings form together the same image, thus greatly improving the resolution of the observed image.

In another embodiment the record carrier plate may be displaceable in two directions of a coordinate system if the markings are arranged in their sequence in the directions of this system and, further, if the diaphragm plate is a pin hole diaphragm.

In still another embodiment a phase grating with suppressed zero order of diffraction may be employed in the place of the diaphragm plate for fading out the markings.

The invented device may be used both with transmitted light and with incident light. By transmitted light the markings are transparent and may be projected on a screen wherefrom the numerals, letters etc. may be read, or the image may be viewed directly as a virtual image without the help of a screen. If incident light is used the markings may also be seen on a screen or observed directly after the light rays have been reflected from the non-transparent hologram section.

BRIEF DESCRIPTION OF THE DRAWINGS

The invention will be more readily comprehended from the following description when taken in conjunction with the appending drawings, wherein FIG. 1 shows schematically a first embodiment of the invention wherein the diaphragm comprises only one aperture, FIG. 2 shows a second embodiment of the invention wherein the diaphragm comprises a plurality of the evenly spaced apertures, FIG. 3 is an embodiment wherein the record carrier plate is displaceable in two directions normal to one another, FIG. 4 is an embodiment wherein the record carrier plate is displaceable in two directions and the diaphragm consists of a phase grating.

DESCRIPTION OF THE PREFERRED EMBODIMENTS

Referring now to FIG. 1, a light source 10 illuminates through a condenser 11 a record carrier plate 12 which is displaceable in guide rails 13 in vertical direction as indicated by the double headed arrow. In line with the record carrier plate 12 and adjacent thereto a diaphragm 14 is stationarily mounted. The record carrier plate comprises a plurality of oblong markings 12a–12k arranged with their longitudinal axes perpendicularly to the direction of movement of the carrier plate. Each marking being a section of a hologram. The diaphragm has a transparent aperture 14a which is arranged in such a manner that in each position of the diaphragm and the record carrier plate relative to one another one marking of the carrier plate is revealed by the aperture so that the light from the light source 10 may transmit therethrough onto a screen 15.

Since, as is well known, in a hologram each section contains the whole information, already a small section, for example having the shape of oblong markings 12a–12k, will be sufficient for reproducing on the screen 15 a complete image of the marking. Of course, the image on the screen will be the sharper the more sections of the hologram are used for producing it.

In order to produce the image from a greater number of hologram sections in such instances where the individual section can only be small, the embodiment described with reference to FIG. 1 may be modified in the manner shown in FIG. 2. The record carrier plate, here denoted 22, is arranged close to the diaphragm 24 in guide rails 13 and comprises small oblong markings 22a–22e. These markings are present on the record carrier plate in triplicate, each group being arranged in the same order in the direction of the movement of the record carrier plate. Corresponding therewith the diaphragm 24 is provided with three apertures 24a–24c extending in parallel to the markings on the record carrier plate and being spaced from one another at such a distance that the markings in each group, which contain the same symbols, are synchronously revealed by the apertures for light transmission.

Since the markings are revealed in correspondence to the displacement of the record carrier plate 12 and 22 respectively, the described devices are suitable for indicating the displacement of the record carrier plate relative to the diaphragm in one direction. This problem often occurs in the measuring and positioning technique.

In case pupil-holograms are used as markings, i.e. holograms which are positioned in infinity relative to the object recorded on the hologram, the image projected on the screen remains stationary, independently from any movement of the recording plate and/or the diaphragm.

Very often the problem exists to define the movement of an object in two directions of a coordinate system, preferably of a rectangular system. Such problem can also be solved by means of the invented device, provided the record carrier plate and the diaphragm are designed accordingly. An embodiment in such a device is illustrated in FIG. 3. The stationarily mounted diaphragm is designed as a pin hole diaphragm comprising a square aperture 34a. The record carrier plate 32 is movable in the two directions of a rectangular coordinate system as indicated by the two double headed arrows. The markings thereon are arranged in the order of the two coordinates, but only one marking is revealed at a time for light transmission and thus for projection of the marking onto the screen 15.

In case the record carrier plate is provided with a plurality of periodically arranged markings as described with reference to FIG. 2, phase gratings may be used in the place of the diaphragm which cause an interference and thus eliminate undesired markings, i.e. hologram sections, in certain orders of diffraction. Such an embodiment of the invention is shown in FIG. 4.

The light source 10 illuminates the record carrier plate 32 through the condenser 11. The record carrier plate comprises for each symbol a plurality of markings or hologram sections. An image forming system 41, 42 is arranged behind the record carrier plate in the direction of light travel for projecting an image of the record carrier plate 32 onto a phase grating 43 having $\lambda/2$ phase shift. Depending on the position of the hologram images relative to the phase grating, hologram images of the same kind impinge either on phase grating areas having the same phase and thus amplify each other in the zero diffraction order or they impinge in a different relative position on phase grating areas which cause a $\lambda/2$ phase shift so that the images extinguish one another, provided the shifted partial waves are of about the same intensity.

It is particularly emphasized that the described manner in which the letters, numerals etc. are projected from the markings onto a screen is given by way of example only. Basically the device is capable of being used both with transmitted light and with incident light. In case transmitted light is used the hologram sections must be transparent, in case incident light is used the hologram sections will be non-transparent but reflecting.

In both embodiments the light rays from the hologram sections may impinge on a screen so that an image of the markings will appear thereon from which they may be read or the virtual image of the markings may be directly observed by means of a negative ocular.

What is claimed is:

1. A device for indicating the position of two mechanical elements relative to one another by oblong markings, such as numerals, letters or symbols, which are revealed and observed in dependence on the relative position of said elements; one element being connected to a displaceable record carrier plate whereon said oblong markings are arranged with their long sides adjacent one another so that their longitudinal axes extend normal to the direction of displacement of the carrier plate; the other element being connected to a diaphragm having a slit-shaped aperture which corresponds in shape and in the way it is arranged to the shape and to the way of arrangement of said markings, and by which in one particular position of said record carrier plate one particular marking is revealed either for light transmission from a light source through said revealed marking and said aperture or for reflection of incident light from said marking, wherein the improvement comprises markings which are sections of holograms.

2. A device for indicating the position of two mechanical elements relative to one another in one direction by revealing numerals, letters or like symbols, said device comprising (a) a record carrier plate movable in one direction, said plate consisting of oblong markings which are sections of holograms, said markings being arranged with their long side adjacent one another and extending with their long axes in a direction normal to the direction of movement of the carrier plate;

(b) a stationary diaphragm having an aperture corresponding in shape to the shape of said markings and being arranged in the same direction as said markings, said diaphragm being arranged adjacent and in alignment with said record carrier plate so that by said aperture one particular marking of said record carrier plate is revealed in dependence on the relative position of said carrier plate and said diaphragm while the remaining markings are covered by said diaphragm;

(c) a light source for illuminating said record carrier plate.

3. A device for indicating the position of two mechanical elements relative to one another as claimed in claim 2, wherein said markings are transparent sections of holograms and said light source illuminates said record carrier plate from the side remote from said diaphragm so that the light transmits through the revealed marking and through said aperture.

4. A device for indicating the position of two mechanical elements relative to one another as claimed in claim 2, wherein said markings are non-transparent sections of holograms and said light source illuminates said record carrier plate from the side of said diaphragm so that the light is reflected from said marking through said aperture.

5. A device for indicating the position of two mechanical elements relative to one another as claimed in claim 2, wherein the record carrier plate is provided with a plurality of markings containing the same symbols and being together indicative for one particular position, said markings being arranged in alternate order with other markings of which also a plurality is indicative for other specific positions of the carrier plate, and wherein the diaphragm comprises as many apertures as there are pluralities of markings on the record carrier plate, said apertures being spaced from one another so that in any given position of said record carrier plate the corresponding plurality of markings is revealed.

6. A device for indicating the position of two mechanical elements relative to one another in two directions by revealing numerals, letters or like symbols, said device comprising (a) a record carrier plate movable in two directions inclined to one another, said plate consisting of equilateral quadrangular markings of which the sides subtend the same angle as the two directions of movement of said record carrier plate, said markings being sections of holograms;

(b) a stationary diaphragm having a pin hole aperture corresponding in shape to the shape of said markings, said diaphragm being arranged adjacent and in alignment with said record carrier plate so that by said aperture one particular marking of said record carrier plate is revealed in dependence on the relative position of said plate in two directions while the remaining markings are covered by said diaphragm; and (c) a light source for illuminating said revealed section of said record carrier plate.

7. A device for indicating the position of two mechanical elements relative to one another as claimed in claim 6, wherein said markings are transparent sections of holograms and said light source illuminates said record carrier plate from the side remote from said diaphragm so that the light transmits through the revealed marking and through said aperture.

8. A device for indicating the position of two mechanical elements relative to one another as claimed in claim 6, wherein said markings are non-transparent sections of holograms and said light source illuminates said record carrier plate from the side of said diaphragm so that the light is reflected from said marking through said aperture.

9. A device for indicating the position of two mechanical elements relative to one another as claimed in claim 3, wherein said diaphragm is a phase grating.

References Cited
UNITED STATES PATENTS 3,612,693 10/1971 Stetson _____ 350—3.5
3,612,698 10/1971 Mathisen _____ 350—3.5

WILLIAM L. SIKES, Primary Examiner

U.S. Cl. X.R.

350—3.5